(12) United States Patent
Johnson et al.

(10) Patent No.: US 8,922,062 B2
(45) Date of Patent: Dec. 30, 2014

(54) AUTOMATIC VOLTAGE REGULATION FOR PHOTOVOLTAIC SYSTEMS

(75) Inventors: Lars Johnson, Concord, CA (US); Robert Johnson, Mill Valley, CA (US)

(73) Assignee: SunPower Corporation, San Jose, CA (US)

( * ) Notice: Subject to any disclaimer, the term of this patent is extended or adjusted under 35 U.S.C. 154(b) by 815 days.

(21) Appl. No.: 13/047,005

(22) Filed: Mar. 14, 2011

(65) Prior Publication Data
US 2012/0235498 A1    Sep. 20, 2012

(51) Int. Cl.
*H02J 1/00*     (2006.01)
*H02J 3/00*     (2006.01)
*H02M 7/48*     (2006.01)
*H02J 3/38*     (2006.01)
*H02J 3/50*     (2006.01)

(52) U.S. Cl.
CPC . *H02J 3/50* (2013.01); *H02J 3/383* (2013.01); Y02E 10/563 (2013.01)
USPC ............................................. 307/82; 363/71

(58) Field of Classification Search
None
See application file for complete search history.

(56) References Cited

U.S. PATENT DOCUMENTS

| | | | |
|---|---|---|---|
| 5,870,297 A | 2/1999 | Dahler et al. | |
| 7,095,220 B2 | 8/2006 | Kernahan | |
| 7,183,667 B2 | 2/2007 | Colby et al. | |
| 7,660,135 B2 | 2/2010 | Fang | |
| 7,884,492 B2 | 2/2011 | Xiong et al. | |
| 2009/0020151 A1 | 1/2009 | Fornage | |
| 2009/0160259 A1 | 6/2009 | Naiknaware | |
| 2010/0116325 A1 | 5/2010 | Nikoonahad | |
| 2010/0134076 A1 | 6/2010 | Cardinal et al. | |
| 2010/0138061 A1* | 6/2010 | Walling et al. | ................ 700/287 |
| 2010/0309692 A1 | 12/2010 | Chisenga et al. | |
| 2011/0032734 A1 | 2/2011 | Melanson | |
| 2011/0089693 A1* | 4/2011 | Nasiri | ............................. 290/44 |
| 2011/0245990 A1* | 10/2011 | Rasmussen | .................. 700/298 |

FOREIGN PATENT DOCUMENTS

WO    WO2011/020124 A2    2/2011

OTHER PUBLICATIONS

PCT International Search Report for Application No. PCT/US2012/026791, Jun. 20, 2012, 2 sheets.
SMA America, LLC—Sunny Central 500CP / 630CP / 720CP / 760CP / 800 CP, High performance comes standard, 2010 Inter Solar Award, pp. 1-6 [retrieved on Feb. 22, 2011], Retrieved from the internet: http://us.pv-contractor.com/us_store/index.php/us_us/aitdownloadablefiles/download/aitfile/aitfile_id/26255/.
SMA America, LLC—Sunny Central Inverter user manual, Version 1.2., pp. 1-44 [retrieved on Feb. 22, 2011], Retrieved from the internet: Shttp://www.dcpower-systems.com/uploads/products/25038_2.pdf.

\* cited by examiner

*Primary Examiner* — Jared Fureman
*Assistant Examiner* — Aqeel Bukhari
(74) *Attorney, Agent, or Firm* — Okamato & Benedicto LLP

(57) ABSTRACT

A photovoltaic system includes solar cells and photovoltaic inverters configured to convert direct current generated by the solar cells to alternating current. Grid voltage at the point of interconnection (POI) of the photovoltaic system and the power grid is measured and compared to a setpoint. A control signal is generated based on the measured grid voltage. The control signal is provided to the photovoltaic inverters. The control signal is adjusted to cause the photovoltaic inverters to generate or absorb reactive power to respond to transient grid voltage changes.

20 Claims, 4 Drawing Sheets

AUTOMATIC VOLTAGE REGULATION FOR PHOTOVOLTAIC SYSTEMS

TECHNICAL FIELD

Embodiments of the subject matter described herein relate generally to photovoltaic systems. More particularly, embodiments of the subject matter relate to automatic voltage regulation for photovoltaic systems.

BACKGROUND

Photovoltaic systems generate electricity from solar radiation. A photovoltaic system may comprise arrays of solar panels, with each solar panel comprising interconnected solar cells. A solar cell includes P-type and N-type diffusion regions. Solar radiation impinging on the solar cell creates electrons and holes that migrate to the diffusion regions, thereby creating voltage differentials between the diffusion regions. In a backside contact solar cell, both the diffusion regions and the metal contact fingers coupled to them are on the backside of the solar cell. The contact fingers allow an external electrical circuit to be coupled to and be powered by the solar cell.

A photovoltaic inverter converts direct current generated by the solar cells to alternating current suitable for coupling to a power grid at a point of interconnection (POI). The grid voltage at the POI is regulated to be within a range of particular values to meet requirements. Embodiments of the present invention pertain to methods and systems for automatically regulating the voltage delivered by a photovoltaic system to a power grid.

BRIEF SUMMARY

In one embodiment, a method of automatically regulating voltage generated by a photovoltaic system includes measuring voltage delivered by the photovoltaic system at a point of interconnection (POI) with a power grid. The measured grid voltage is compared to a setpoint voltage. An inverter reference voltage is generated based on the comparison of the measured grid voltage to the setpoint voltage. The inverter reference voltage is presented to a photovoltaic inverter at the location of the photovoltaic inverter. The inverter reference voltage is adjusted to respond to rapidly changing grid voltage.

In another embodiment, a photovoltaic system comprises a plurality of solar cells, a plurality of photovoltaic inverters, and a plant controller. The plant controller is configured to adjust an inverter reference voltage based on a measured voltage measured at a point of interconnection (POI) of a photovoltaic system with a power grid, and to provide the inverter reference voltage to a photovoltaic inverter in the plurality of photovoltaic inverters to adjust a reactive power output of the photovoltaic inverter and respond to a changing grid voltage at the POI.

In another embodiment, a method of automatically regulating voltage generated by a photovoltaic system includes measuring voltage provided by the photovoltaic system to a power grid. A control signal to control operation of a photovoltaic inverter is generated based on the measured voltage. The control signal is adjusted to adjust a reactive power output of the photovoltaic inverter in response to a change in the measured voltage.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
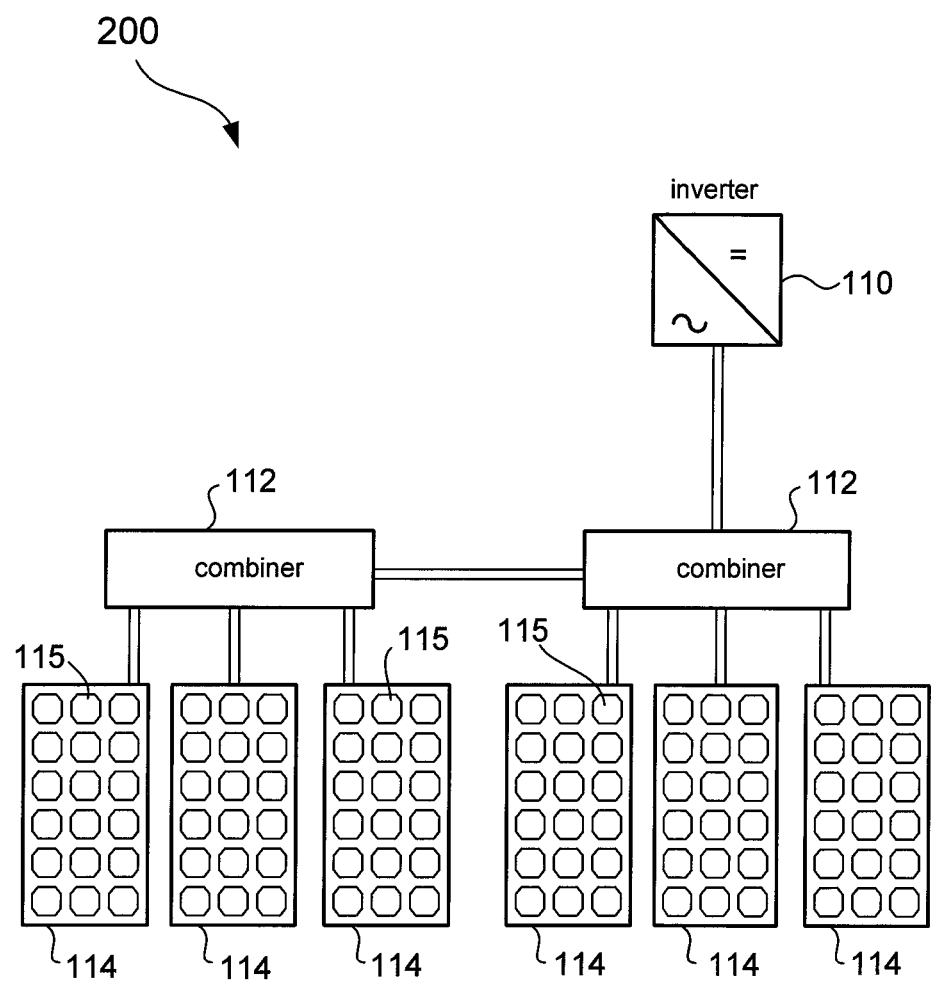
FIG. 1 schematically shows components of a photovoltaic system in accordance with an embodiment of the present invention.

FIG. 1 schematically shows components of a photovoltaic system 200 in accordance with an embodiment of the present invention. The photovoltaic system components shown in the example of FIG. 1 include a plurality of combiner boxes 112, a plurality of solar panels 114, and a photovoltaic inverter 110. A photovoltaic system may include a plurality of inverters but only one is shown in FIG. 1 for clarity of illustration. A solar panel 114 comprises electrically connected solar cells mounted on the same frame. In one embodiment, each solar panel 114 comprises a plurality of serially-connected backside contact solar cells 115. Front contact solar cells may also be employed. Only some of the backside contact solar cells 115 have been labeled in FIG. 1.

A photovoltaic string comprises a plurality of serially-connected solar panels 114 as in FIG. 1. A group of solar panels 114 is electrically connected to a combiner box 112, where the solar panels 114 are connected in series. The combiner boxes 112 are electrically connected such that that all solar panels 114 in the photovoltaic string are serially-connected. The output of the photovoltaic string is electrically connected to the inverter 110, which converts direct current (DC) generated by the solar cells 115 to alternating current (AC) suitable for delivery to a utility power grid, for example.

Figure 2:
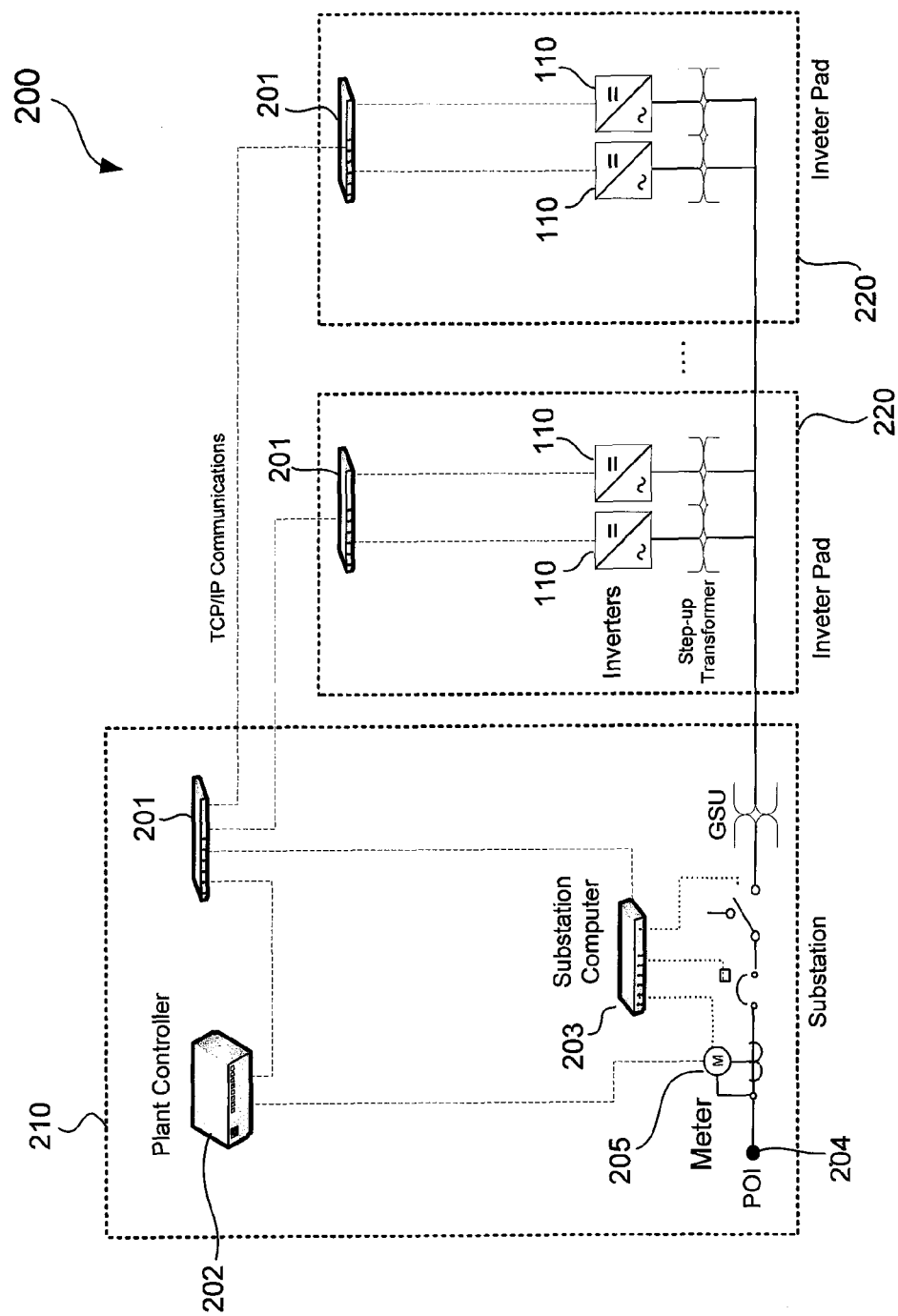
FIG. 2 schematically shows additional components of the photovoltaic system of FIG. 1 in accordance with an embodiment of the present invention.

FIG. 2 schematically shows additional components of the photovoltaic system 200 in accordance with an embodiment of the present invention. FIG. 2 shows the inverters 110 described in connection with FIG. 1. The solar panels 114 are not shown in FIG. 2 for clarity of illustration. In the example of FIG. 2, the components of the photovoltaic system 200 are located in a photovoltaic substation 210 and inverter pads 220.

An inverter pad 220 is a general area where inverters are located. The inverter pads 220 are typically located away from the substation 210, far from the point of interconnection (POI) 204 with the power grid. Communication modules 201 allow for data communications between the inverters 110 and components located in the substation 210. An inverter pad 220 may also include additional components that are not specifically shown in FIG. 2, such as analog to digital converters, digital to analog converters, and other components for supporting the operation of the inverters 110.

In one embodiment, the operation of the photovoltaic system 200 is controlled using Supervisory Control and Data Acquisition (SCADA), with the plant controller 202 serving as the central control computer. In one embodiment, the inverters 110, the plant controller 202, and a substation computer 203 communicate in accordance with the Modbus TCP/IP communications protocol. In that embodiment, the communication modules 201 comprise Ethernet switches that provide data communication links between components of the photovoltaic system 200. Monitoring and control may also be performed by analog signaling, such as by providing individual wiring for signals.

In the example of FIG. 2, a step-up transformer in an inverter pad 220 steps-up the AC voltage output of an inverter 110 to a higher voltage for distribution to the substation 210. A generator step-up (GSU) transformer in the substation 210 further steps-up the AC voltage received from the inverter pads 220 before being coupled to the POI 204 for distribution to the power grid (not shown). A substation computer 203 allows for control and monitoring of the substation 210. The substation computer 203 may be configured to control protective circuits and read the voltage at the POI 204 by way of a meter 205.

A plant controller 202 in the substation 210 may comprise a special-purpose or general-purpose computer configured to facilitate control of the voltage at (or near) the POI 204. As will be more apparent below, the plant controller 202 may facilitate control of the voltage at the POI 204 by manipulating a control signal in the form of an inverter reference voltage.

The voltage at a point of interconnection may be controlled by automatic voltage regulation (AVR). Generally speaking, AVR may involve manipulation of reactive power export/import from the photovoltaic system by manipulating reactive (or power factor) setpoints at the inverter to control the voltage at the point of interconnection with the distribution, transmission, or other electrical connection to the grid. AVR may also be employed to coordinate operation of a photovoltaic system with reactive power sources, such as static VAR compensators and capacitive banks.

Although AVR can adapt to changing grid voltages by itself, it may be too slow to react in some situations. For example, when the AVR controller is attempting to reduce the grid voltage (e.g., the grid is at 1.03 pu, and the AVR setpoint is at 1.02 pu) by absorbing a large amount of reactive power, the inverter terminal voltage may be at a lower value (e.g., 0.96 pu) due to the impedance of the AC collection subsystem within the power plant. This may result in the inverter terminal voltages to be as much as 7% lower than the voltage at the point of interconnection. If the grid voltage were to suddenly dip down, e.g., to 0.97 pu, faster than the response time of the AVR controller and the inverters are still absorbing reactive power, the inverter terminal voltages may drop very low, e.g., to 0.90 pu, and result in the inverters tripping off because the inverters typically have a narrow operating window, which may be +/−10%. To address the slow response time of a typical AVR implementation, embodiments of the present invention generate and manipulate a control signal to allow an inverter to rapidly adapt to changing grid conditions.

Figure 3:
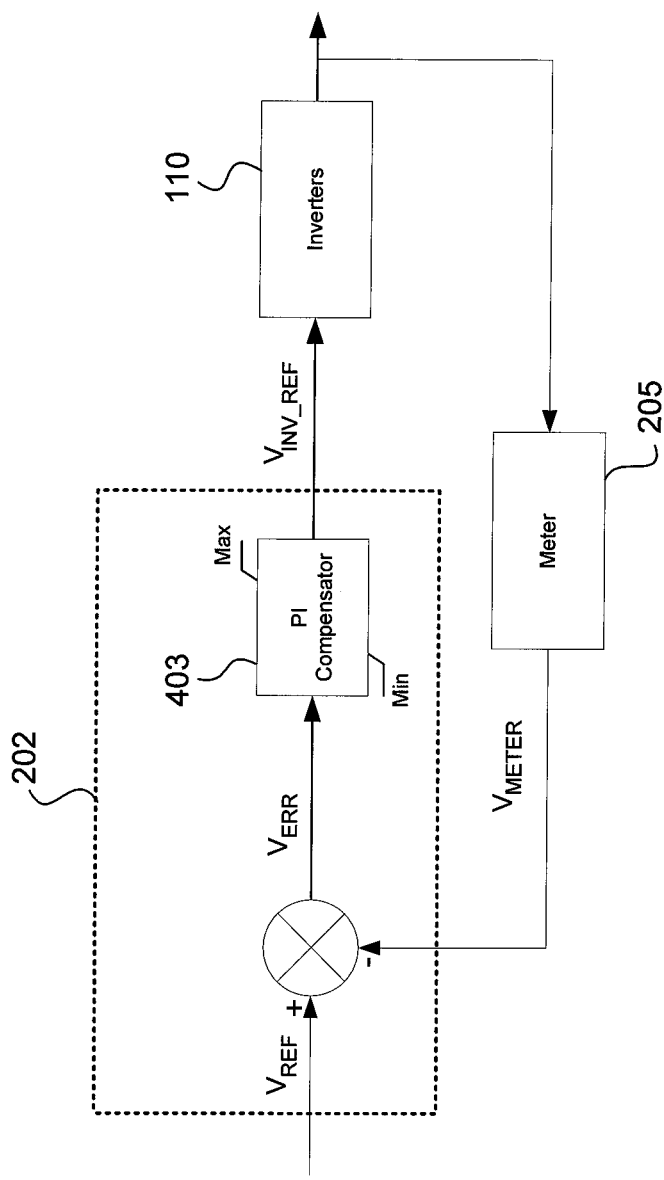
FIG. 3 shows a flow diagram of a method of automatic voltage regulation for a photovoltaic system in accordance with an embodiment of the present invention.

FIG. 3 shows a flow diagram of a method of automatic voltage regulation for a photovoltaic system in accordance with an embodiment of the present invention. The method of FIG. 3 is explained using the components of FIG. 2 for illustration purposes.

In the example of FIG. 3, the plant controller 202 serves as an AVR controller. The plant controller 202 receives a setpoint voltage in the form of a reference voltage $V_{REF}$. The reference voltage $V_{REF}$ may be received from a SCADA source or data processing gateway, for example. The reference voltage $V_{REF}$ corresponds to a predetermined, desired regulated voltage level at the POI 204.

In one embodiment, the inverters 110 are configured to generate or absorb reactive power as a function of an inverter reference voltage presented at the terminals of the inverters 110 at the inverter pads 220. Examples of commercially-available inverters with this capability include those from SMA Solar Technology AG of Germany. Other suitable inverters may also be used. When the inverter reference voltage is adjusted in response to the voltage at the POI 204 being too high (e.g., above a threshold voltage), an inverter 110 may absorb reactive power to lower the voltage at the POI 204. Similarly, when the inverter reference voltage is adjusted in response to the voltage at the POI 204 being too low (e.g., below a threshold voltage), the inverter 110 may generate reactive power to increase the voltage at the POI 204. Inverter electronics are especially suitable for this function, and some commercially-available inverters 110 have a response time as fast as one or a few AC cycles. The fast response time of the inverter 110 allows the inverter terminal voltages to stay within its operating window in response to transient grid voltage changes, and further allows the inverter 110 to generate emergency reactive power when the utility grid needs it most.

Because of the impedance in the AC collection system, there may be a large difference between the voltage at the POI 204 and the voltage at the terminal of an inverter 110. That is, the voltage at the terminal of an inverter 110 at an inverter pad 220 is not necessarily the same as the voltage at the POI 204.

In accordance with an embodiment, the plant controller 202 receives a reading of the voltage at the POI 204 from the meter 205. The plant controller 202 generates an error signal $V_{ERR}$, which indicates the difference between the desired voltage at the POI 204 (Vref) and the actual voltage at the POI 204 ($V_{METER}$). The error signal is provided to a compensator 403, which generates a control signal in the form of the inverter reference voltage $V_{INV\_REF}$ based on the error signal. The compensator 403 adjusts the inverter reference voltage $V_{INV\_REF}$ to minimize the error between desired and actual voltage at the POI 204. The compensator 403 adjusts the inverter reference voltage $V_{INV\_REF}$ within minimum ("Min") and maximum ("Max") values. In one embodiment, the compensator 403 generates the inverter reference voltage $V_{INV\_REF}$ using a proportional-integral (PI) control scheme. Other control schemes that may be used include proportional, integral, derivative, proportional-integral, integral-derivative, proportional-derivative, and proportional-integral-derivative.

The inverter reference voltage $V_{INV\_REF}$ is received by the inverter 100, which then generates or absorbs reactive power based on the value of the inverter reference voltage $V_{INV\_REF}$. The feedback cycle continues to maintain the voltage at the POI 204 within a regulated voltage dictated by the setpoint voltage represented by the reference voltage $V_{REF}$.

Figure 4:
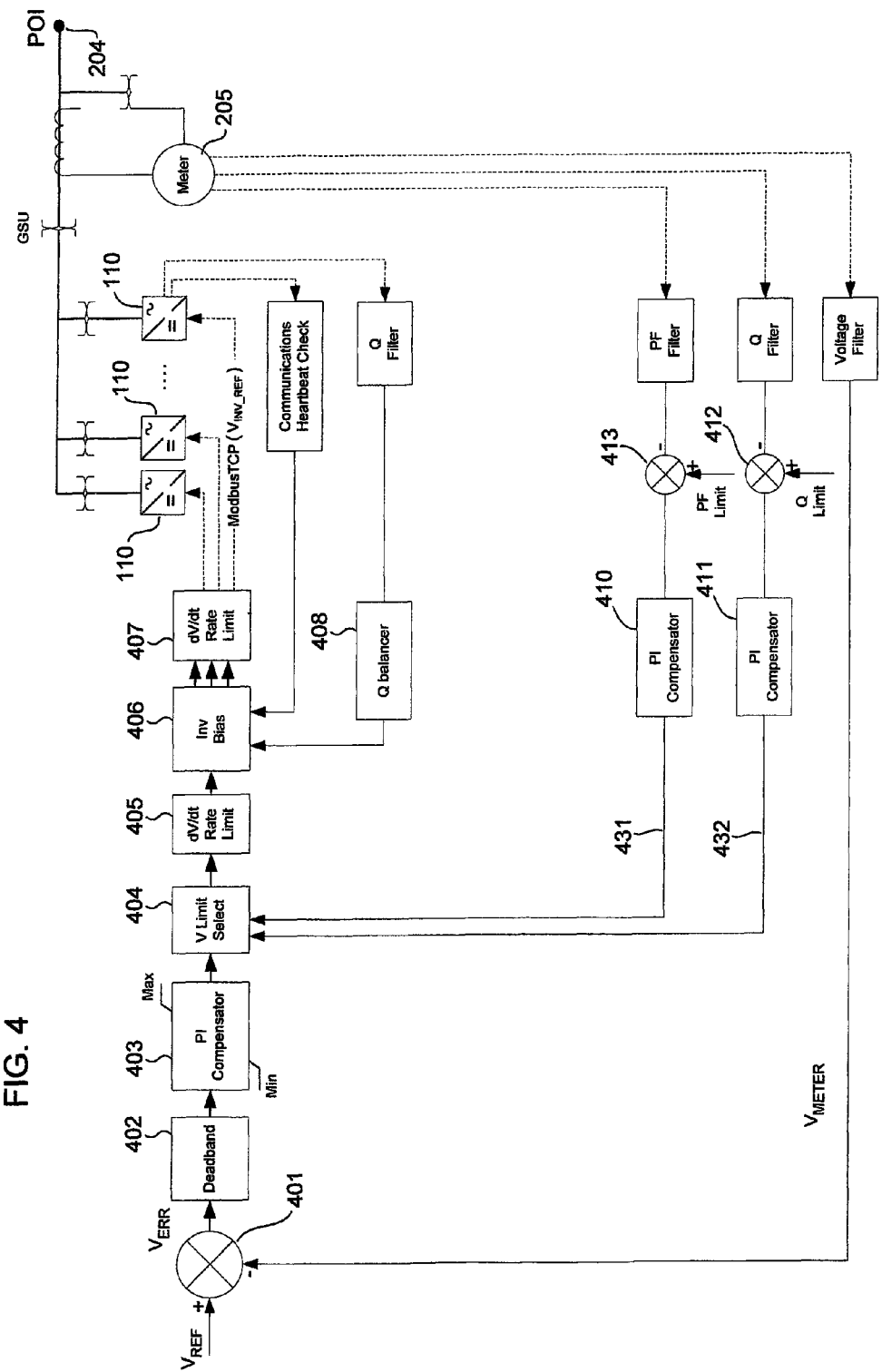
FIG. 4 schematically shows further details of the photovoltaic system of FIG. 2 in accordance with an embodiment of the present invention.

FIG. 4 schematically shows further details of the photovoltaic system 200 in accordance with an embodiment of the present invention.

In the example of FIG. 4, the function blocks 401-408 and 410-413 are performed by the plant controller 202. As can be appreciated, these functions may be implemented in software, hardware, or combination of hardware/software. For example, the plant controller 202 may comprise a computer with hardware interfaces for analog input direct measurement and control, data communications (e.g., Ethernet network adapter), data acquisition (e.g., to receive signals) and control (e.g., to send control signals), and associated driver software. The plant controller 202 may utilize dedicated processors or co-processors in combination with application software to perform its functions. The plant controller 202 may also be employed in a master-slave configuration with other controllers to coordinate operation of the photovoltaic system 200 with reactive power sources, such as static VAR compensators and capacitive banks.

Referring to FIG. 4, the plant controller 202 receives a reference voltage $V_{REF}$ that is employed as a setpoint voltage for setting the voltage at the POI 204. A summer 401 generates an error signal $V_{ERR}$ based on the difference between the desired voltage at the POI 204 as indicated by the reference voltage $V_{REF}$ and the voltage at the POI 204 as measured by the meter 205 ($V_{METER}$).

In one embodiment, the reference voltage $V_{REF}$ and the meter voltage reading $V_{METER}$ are processed in the plant controller 202 as digital signals. These voltages may be converted to digital using an analog to digital converter (ADC), and then provided to the plant controller 202 over a data communications network. As a particular example, the reference voltage $V_{REF}$ and the meter voltage reading $V_{METER}$ may be provided to the plant controller 202 by way of ModbusTCP registers. Bounds checking may be performed on commands and inputs (including the reference voltage $V_{REF}$ and the meter voltage reading $V_{METER}$) received by the plant controller 202.

The reference voltage $V_{REF}$, the meter voltage reading $V_{METER}$, and other voltages/currents in the photovoltaic system may be represented by other types of signals with appropriate changes to the rest of the photovoltaic system 200. For example, a voltage signal may be represented by a current signal, and vice versa. As another example, voltages and currents in the photovoltaic system may be represented in RMS (root mean square).

An unloading deadband function (block 402) may or may not be enabled depending on the application. The unloading deadband function allows the error voltage $V_{ERR}$ to vary within a range without adjusting the control signal to the inverters 110. More specifically, the unloading deadband function allows the input to the compensator 403 to vary up or down when the grid voltage (i.e., the voltage at the POI 204) is within bounds (typically ±1% of nominal), and keep the inverters 110 at a reference voltage setting so that the inverters 110 export a unity power factor. In other words, if the grid voltage is within for example ±1%, the input to the compensator 403 is actually just the grid voltage. This will also cause the inverters 110 to go to unity power factor if the grid voltage is within the deadband limits.

In one embodiment, the compensator 403 comprises a PI compensator. The PI compensator 403 may be absolute, which means the inverter reference voltage $V_{INV\_REF}$ is is biased up or down based on the error signal $V_{ERR}$ and the proportional gain (Kp) and integral gain (Ki) of the PI compensator 403. However, the inverter reference voltage $V_{INV\_REF}$ may remain anchored by the reference voltage $V_{REF}$. The compensator 403 may also be incremental. The compensator 403 may have integral windup protection and saturation limits. The compensator 403 may be enabled or disabled due to state machine logic that is triggered when grid disturbances occur.

A voltage limit select function (block 404) is configured to reduce or increase the inverter reference voltage $V_{INV\_REF}$ output of the compensator 403 based on inputs from the power factor limiter (sub-loop 431) and reactive power limiter (sub-loop 432) sub-loops. The voltage limit select function adjusts the inverter reference voltage $V_{INV\_REF}$ such that an inverter 110 does not generate an output that exceeds a power factor limit (PF limit) and a reactive power limit (Q limit).

The power factor limiter sub-loop (sub-loop 431) is configured to limit the inverter reference voltage $V_{INV\_REF}$ when the power factor measured by the meter 205 at the POI 204 is close to, at, or over a power factor limit (PF Limit). The power factor reading from the meter 205 is filtered by a power factor filter (PF Filter) and then compared to the power factor limit (block 413). The power factor limiter sub-loop has its own compensator 410 because the power factor at the POI 204 is not necessarily the same as the power factor at the inverter terminals due to impedance changes in real power flowing through the plant AC collection system. The compensator 409 may employ a PI or other control scheme.

The reactive power limiter sub-loop (sub-loop 432) is configured to limit the reactive power output of the inverters 110 when the reactive power measured by the meter 205 at the POI 204 is close to, at, or over a reactive power limit (Q Limit). The reactive power reading from the meter 205 is filtered by a reactive power filter (Q Filter) and then compared to the reactive power limit (block 412). The reactive power sub-loop has its own compensator 411 because reactive power factor at the POI 204 is not necessarily the same as at the reactive power at the inverter terminals due to impedance changes in real power flowing through the plant AC collection system. The compensator 410 may employ a PI or other control scheme.

A global rate limit function (block 405) limits the rate of change of the inverter reference voltage $V_{INV\_REF}$. This protects against rapid and drastic changes to the inverter reference voltage $V_{INV\_REF}$.

An inverter bias function (block 406) is configured to compensate for inverter outages by modifying individual inverter reference voltages if necessary. The inverter bias function may bias individual inverter reference voltages up or down based on inverter bias values calculated by the reactive power balancer function (block 408). The reactive power balancer function examines the reactive power output from all inverters 110 that the plant controller 202 is communicating with. If a particular inverter 110 is exporting/absorbing more reactive power than other inverters 110, the individual inverter reference voltage $V_{INV\_REF}$ for that particular inverter 110 will be adjusted up or down accordingly. The reactive power balancer function may read an inverter reactive power output directly from the inverter terminal. There are multiple reactive power filters (Q filter) and reactive power inputs to the reactive power balancer 408, but only one set is shown in FIG. 4 for clarity of illustration.

The inverter bias function may periodically receive a heartbeat signal from each inverter 110 to detect inverter outages. An individual rate limit function (block 407) is applied to each individual inverter reference voltage $V_{INV\_REF}$ before being provided to a corresponding inverter 110. In one embodiment, an inverter reference voltage $V_{INV\_REF}$ is provided to a corresponding inverter 110 by way of a ModbusTCP register. The inverter reference voltage $V_{INV\_REF}$ is read from the register and converted to an analog voltage signal, which is then presented to a terminal of the inverter 110 at the inverter pad 220 where the inverter 110 is located.

An improved automatic voltage regulation technique for photovoltaic systems has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of automatically regulating voltage generated by a photovoltaic system, the method comprising:
    measuring voltage delivered by a photovoltaic system at a point of interconnection (POI) with a power grid to generate a measured grid voltage;
    comparing the measured grid voltage to a reference voltage, the reference voltage indicating a setpoint voltage for the POI;
    generating an inverter reference voltage based on the comparison of the measured grid voltage to the reference voltage;
    presenting the inverter reference voltage to a photovoltaic inverter at the location of the photovoltaic inverter, the photovoltaic inverter converting direct current generated by solar cells to alternating current for delivery to the power grid; and
    adjusting the inverter reference voltage to respond to transient changes to the measured grid voltage.

2. The method of claim 1 wherein the inverter reference voltage is generated by a compensator in accordance with a control scheme.

3. The method of claim 2 wherein the control scheme comprises a proportional-integral compensator.

4. The method of claim 1 further comprising:
    limiting a rate of change of the inverter reference voltage.

5. The method of claim 1 further comprising:
    limiting the inverter reference voltage based on a comparison of reactive power generated by the photovoltaic inverter against reactive power generated by other photovoltaic inverters in the photovoltaic system.

6. The method of claim 1 wherein the solar cells comprise backside contact solar cells mounted in solar panels.

7. The method of claim 1 wherein the inverter reference voltage is provided to the photovoltaic inverter by way of registers transmitted over a data communications network.

8. The method of claim 1 wherein the inverter reference voltage is adjusted to cause the photovoltaic inverter to absorb reactive power when the measured voltage indicates that the grid voltage is above a threshold voltage.

9. The method of claim 1 wherein the inverter reference voltage is adjusted to cause the photovoltaic inverter to generate reactive power when the measured voltage indicates that the grid voltage is below a threshold voltage.

10. A photovoltaic system comprising:
    a plurality of solar cells;
    a plurality of photovoltaic inverters configured to convert direct current generated by the plurality of solar cells to alternating current; and
    a plant controller configured to adjust an inverter reference voltage based on a measured voltage measured at a point of interconnection (POI) of a photovoltaic system with a power grid, and to provide the inverter reference voltage to a photovoltaic inverter in the plurality of photovoltaic inverters to adjust a reactive power output of the photovoltaic inverter and respond to a changing grid voltage at the POI.

11. The photovoltaic system of claim 10 further comprising a meter configured to measure the measured voltage at the POI.

12. The photovoltaic system of claim 10 further comprising a plurality of switches providing data communication links between the plant controller and the plurality of photovoltaic inverters.

13. The photovoltaic system of claim 10 wherein the plant controller is configured to limit a rate of change of the inverter reference voltage.

14. The photovoltaic system of claim 10 wherein the plant controller provides the inverter reference voltage to the photovoltaic inverter in digital form over a data communications network.

15. The photovoltaic system of claim 10 wherein the plant controller is configured to limit the inverter reference voltage based on a comparison of reactive power generated by the photovoltaic inverter and reactive power generated by other photovoltaic inverters in the plurality of photovoltaic inverters.

16. A method of automatically regulating voltage generated by a photovoltaic system, the method comprising:
    measuring voltage provided by a photovoltaic system to a power grid to generate a measured voltage;
    generating a control signal to control operation of a photovoltaic inverter, the control signal being generated based on the measured voltage; and
    adjusting the control signal to adjust a reactive power output of the photovoltaic inverter in response to a change in the measured voltage.

17. The method of claim 16 wherein adjusting the control signal comprises:
    adjusting the control signal to make the photovoltaic inverter absorb or export reactive power based on a difference between the measured voltage and a reference voltage.

18. The method of claim 16 wherein the control signal comprises a voltage signal provided to the photovoltaic inverter at a location of the photovoltaic inverter.

19. The method of claim 16 wherein the measured voltage is measured at a point of interconnection of the photovoltaic system with the power grid.

20. The method of claim 16 wherein the photovoltaic inverter converts direct current generated by backside contact solar cells to alternating current.

* * * * *